(12) United States Patent
Wang et al.

(10) Patent No.: US 6,790,343 B2
(45) Date of Patent: Sep. 14, 2004

(54) SULFUR TRANSFER ADDITIVE FOR CATALYTIC CRACKING OF HYDROCARBONS AND A CATALYTIC CRACKING PROCESS OF HYDROCARBONS USING THE SAME

(75) Inventors: Longyan Wang, Henan (CN); Haiqing Guo, Henan (CN); Wenyi Qi, Henan (CN); Shuqin Su, Henan (CN); Xianliang Deng, Henan (CN); Jinlong Liu, Henan (CN); Shufang Liu, Henan (CN)

(73) Assignees: China Petro-chemical Corporation, Beijing (CN); Luoyang Petro-chemical Engineering Corporation, Sinopec, Henan (CN)

( * ) Notice: Subject to any disclaimer, the term of this patent is extended or adjusted under 35 U.S.C. 154(b) by 21 days.

(21) Appl. No.: 10/292,681

(22) Filed: Nov. 12, 2002

(65) Prior Publication Data

US 2003/0121824 A1 Jul. 3, 2003

Related U.S. Application Data

(62) Division of application No. 09/472,772, filed on Dec. 27, 1999, now abandoned.

(30) Foreign Application Priority Data

Dec. 29, 1998 (CN) ........................................ 98122187 A

(51) Int. Cl.⁷ .............................................. C10G 11/00
(52) U.S. Cl. ............................ 208/120.25; 208/120.01; 208/120.1; 208/120.15; 208/120.2; 208/120.3
(58) Field of Search ........................ 208/120.01, 120.1, 208/120.15, 120.2, 120.25, 120.3

(56) References Cited

U.S. PATENT DOCUMENTS

| | | | |
|---|---|---|---|
| 2,635,041 A | 4/1953 | Hansley et al. | |
| 2,927,849 A | 3/1960 | Greblick et al. | |
| 4,238,317 A | * 12/1980 | Vasalos et al. | 208/120.05 |
| 4,240,899 A | * 12/1980 | Gladrow et al. | 208/120.25 |
| 4,243,557 A | * 1/1981 | Gladrow et al. | 502/65 |
| 4,412,914 A | 11/1983 | Hettinger, Jr. et al. | |
| 4,451,355 A | 5/1984 | Mitchell et al. | |
| 4,589,978 A | 5/1986 | Green et al. | |
| 4,619,696 A | 10/1986 | Gorgerino | |
| 4,627,911 A | * 12/1986 | Chen et al. | 208/120.01 |
| 4,750,987 A | * 6/1988 | Beck et al. | 208/113 |
| 4,752,302 A | 6/1988 | Bowers et al. | |
| 4,889,615 A | 12/1989 | Chin et al. | |
| 4,957,892 A | 9/1990 | Yoo et al. | |
| 4,983,558 A | 1/1991 | Born et al. | |
| 4,988,653 A | 1/1991 | Herbst et al. | |
| 5,021,228 A | 6/1991 | Dai et al. | |
| 5,275,630 A | 1/1994 | Dorer | |
| 5,371,055 A | 12/1994 | Cormier et al. | |
| 5,376,608 A | 12/1994 | Wormsbecher et al. | |
| 5,545,604 A | 8/1996 | Demmel | |
| 5,785,881 A | 7/1998 | Puckace | |
| 5,944,858 A | 8/1999 | Wallace | |
| 6,111,082 A | 8/2000 | Yunlu et al. | |

FOREIGN PATENT DOCUMENTS

| | | |
|---|---|---|
| EP | 0 476 196 A1 | 3/1992 |
| WO | WO-88/03551 | 5/1988 |

* cited by examiner

Primary Examiner—Walter D. Griffin
(74) Attorney, Agent, or Firm—Christie, Parker and Hale, LLP

(57) ABSTRACT

The present invention relates to a sulfur transfer additive for catalytic cracking of hydrocarbons and a catalytic cracking process of hydrocarbons using the sulfur transfer additive, said additive is a uniform liquid comprising at least two metal elements selected from the following three classes: a). alkaline earth metals, b). transition metals and P zone metals, and c). rare earth metals, and wherein there are at least two metal elements from the different classes. The present sulfur transfer additive can reduce the $SO_x$ content in the regenerator flue gas and the sulfur content in the light oil products at the same time, and has no negative effect on the activity and selectivity of the catalyst in the FCC system.

19 Claims, No Drawings

SULFUR TRANSFER ADDITIVE FOR CATALYTIC CRACKING OF HYDROCARBONS AND A CATALYTIC CRACKING PROCESS OF HYDROCARBONS USING THE SAME

CROSS REFERENCE TO RELATED APPLICATION

This application is a divisional of patent application Ser. No. 09/472,772, filed Dec. 27, 1999, now abandoned, which claims priority to Chinese Patent Application No. 98-122187.4, filed on Dec. 29, 1998, both of which are hereby incorporated by reference.

The present invention relates to a sulfur transfer additive for catalytic cracking of hydrocarbons and a catalytic cracking process of hydrocarbons. More particularly, the present invention relates to a liquid sulfur transfer additive for catalytic cracking of hydrocarbons comprising at least two metal elements, and a catalytic cracking process using said sulfur transfer additive.

The hydrocarbon feed processed in the commercial fluidized catalytic cracker (FCC) usually contains 0.3 to 3.0% by weight of sulfur. Based on the total amount of the sulfur contained in the hydrocarbon feed, about 20 to 60% by weight of the sulfur is transferred to the cracked gas in form of $H_2S$, which can be recovered by converting it into elemental sulfur, about 20 to 70% by weight to the light oil products as organic sulfur compounds, which must be removed from the oil products by means of hydrotreating or hydrofining, and the remaining about 5 to 30% by weight to the coke deposited on the catalyst particles. However, when the amount of sulfur contained in the hydrocarbon feed is higher, the light oil products will contain too much of sulfur to meet the standard specifications for the products. Although the sulfur content in the light oil products can be reduced to meet the specifications by lowering the initial boiling point (IBP) or by means of other more severe post-treatment, this will increase the costs and decrease the profits. In the catalyst regenerator of the FCC system, the sulfur contained in the coke is burned off, forming sulfur dioxide and sulfur trioxide (collectively called $SO_x$ hereinafter), which are emitted to the atmosphere with the flue gas, resulting in environmental pollution. In addition, the higher amount of $SO_x$ in the regenerator flue gas leads to corrosion of the regenerator equipment.

The solution most widely used nowadays to reduce the $SO_x$ content in regenerator flue gas and the sulfur content in light oil products of FCC system is the use of solid sulfur transfer additives. The solid sulfur transfer additives can be divided into two categories. One is the additives dedicated to reduce the $SO_x$ concentration in regenerator flue gas, and the other is the additives dedicated to reduce the sulfur content in light oil products, especially gasoline. The sulfur transfer additives described in U.S. Pat. Nos. 4,589,978 and 5,021,228 fall into the first category, while the sulfur transfer additive described in U.S. Pat. No. 5,376,608 falls into the second category. The sulfur transfer additive disclosed in U.S. Pat. No. 4, 589, 978 contains 1~20% of lanthanum (La), cerium (Ce) and a support, wherein the weigh ratio of lanthanum to cerium is 1:10 to 10:1, and the support can be alumina, silica, kieselguhr or zeolite, etc. This sulfur transfer additive is used as separate particles and mixed with the catalytic cracking catalyst. With this sulfur transfer additive, it is required to operate the regenerator at a full CO combustion mode, 0–2% (vol.) excess of $O_2$. When 0.5~4.8% of the sulfur transfer additive based on the catalyst inventory of the FCC system is added, $SO_x$ can be reduced by 30~80%. U.S. Pat. No. 5,021,228 disclosed a sulfur transfer additive which is a composition containing (1) porous alumina support, (2) as a first component the metals of actinium series such as the thorium and uranium in amount of 0.5~10 wt. %, (3) as a second component the alkali metal such as potassium and sodium in amount of 1~5% wt. %. This composition is used as one component of the catalytic cracking catalyst and 60% of $SO_x$ can be transferred to $H_2S$. U.S. Pat. No. 5,376,608 disclosed a catalytic cracking catalyst composition comprising a zeolite dispersed in an inorganic oxide matrix and, as a separate component, a Lewis acid supported on alumina, wherein the separate component comprises 1~50 wt. % of elements and compounds Ni, Cu, Zn, Ag, Cd, Ti, Bi, B and Al. Other components of the composition are 5~50 wt. % of synthetic faujasite, 10~60 wt. % of clay, and 10~30 wt. % of inorganic binder selected from silica, alumina and silica-alumina. It was reported that the sulfur content in gasoline was markedly reduced without any negative effect on the gasoline yield using the composition.

The prior art sulfur transfer additives such as those disclosed in the above-mentioned patents are of only single-function, i.e. the additives which can reduce the $SO_x$ concentration in regenerator flue gas can not reduce the sulfur content in the light oil products, and the additives which can reduce the sulfur content in the light oil products can not reduce the $SO_x$ concentration in regenerator flue gas. Furthermore, these sulfur transfer additives have no catalytic activity, and will dilute the catalyst if added into the cracking catalyst. As a result, the activity of the catalyst in the FCC system is reduced and the selectivity becomes deteriorated. For instance, when 5.0% of sulfur transfer additive is added to an equilibrium catalyst with a microactivity of 60, the microactivity will be lowered by about 3 unit and the selectivity is significantly affected. Additionally, the prior art sulfur transfer additives are all solid, thus requires that the particle distribution, mechanical strength and sphericity of the sulfur transfer additives be matched well with those of the catalyst. When the solid particles are added to the FCC system, the ratio of the su transfer additive to the catalyst inventory in the system can not be flexibly adjusted, thus, can not accommodate to the operation for frequent variations in the sulfur content in the hydrocarbon feed. Furthermore, the preparation of the solid sulfur transfer additives need complex equipment.

It is an object of the present invention to provide a liquid sulfur transfer additive and a catalytic cracking process using the same, which can reduce the $SO_x$ content in the regenerator flue gas and the sulfur content in the light oil products at the same time, and has no negative effect on the activity and selectivity of the catalyst in FCC system, so as to overcome the defects of the prior art solid sulfur transfer additives i.e. the solid sulfur transfer additives in the prior art can only reduce the $SO_x$ content in the regenerator flue gas or can only reduce the sulfur content in the light oil products, and to obviate the negative effect of the prior art sulfur transfer additives on the cracking catalyst activity and selectivity, After extensive and profound research, the present inventors find the following sulfur transfer additive and catalytic cracking process, and achieve the object as stated above.

In the first aspect, the present invention provides a sulfur transfer additive for catalytic cracking of hydrocarbons, characterized in that it is a liquid product comprising at least two metal elements selected from the following three classes:
  a). alkali earth metals,
  b). transition metals and P zone metals, and
  c). rare earth metals,
and wherein there are at least two metal elements from the different classes.

In the second aspect, the present invention provides a process for catalytic cracking of hydrocarbons, characterized in that the sulfur transfer additive as stated in the first aspect of the present invention is used.

In yet another aspect, the present invention provides an application process of the sulfur transfer additive of the present invention as stated above.

These and other aspects of the present invention are apparent to the ordinary skilled in the art with reference to the following detailed description of the present invention.

The sulfur transfer additive of the present invention comprises at least two metal elements selected from the following three classes: a) alkali earth metals, b) transition metals and P zone metals, and c) rare earth metals, and wherein there are at least two metal elements from the different classes. That is to say, the present sulfur transfer additive comprises at least one metal element selected from alkali earth metals and at least one metal element selected from transition metals and P zone metals, or comprises at least one metal element selected from alkali earth metals and at least one metal element selected from rare earth metals, or comprises at least one metal element selected from transition metals and P zone metals and at least one metal element selected from rare earth metals, or comprises at least one metal element selected from alkali earth metals, at least one metal element selected from transition metals and P zone metals and at least one metal element selected from rare earth metals.

In the present application, the term "alkali earth metals" refers to Group IIA metal elements in the Mendelyeev Periodic Table of Elements, and includes Be, Mg, Ca, Sr, Ba and Ra, preferably Mg, Ca, Sr and Ba, and more preferably Mg and Ca. The term "transition metals" refers to the metal elements of Group IB to VIIB and Group VIII in the Mendelyeev Periodic Table of Elements excluding Lanthanide series elements and Actinium series elements, preferably Sc, Ti, Zr, Hf, V, Cr, Mn, Fe, Co, Ni, Pd, Cu, Ag, Zn, Cd and the like, more preferably Zn, Ag, Cd and Ti. The term "P zone metals" refers to the metal and metalloid elements in P zone, i.e. Group IIIA to VIIA in the Mendelyeev Periodic Table of Elements, and includes B, Al, Ga, In, Ti, Si, Ge, Sn, Pb, P, As, Sb, Bi, Te and Po, preferably B, Al, Ga, In, Ge, Sn, Pb, Sb and Bi, and more preferably B, Al, Ga, Sn, Pb and Bi, and most preferably Bi, Al, Pb and Sn. The term "rare earth metals" refers to the Lanthanide series elements in the Mendelyeev Periodic Table of Elements, and includes the elements with atomic number of from 57 to 71, preferably La, Ce, Pr, Nd, Pm, Sm, Eu and Gd, more preferably La, Ce, Pr and Nd.

The metal elements in the present sulfur transfer additive can be present in any compound form, such as oxide, hydroxide, organic acid salt, inorganic acid salt, complex or the like of the metal elements. The selection on the specific metal compound depends upon the solubility, emulsifiability or dispersability of the compound in the relevant liquid medium (solvent, emulsifying medium, suspending medium or dispersing medium), to facilitate the formulation of the present liquid sulfur transfer additive in form of a solution, colloid, emulsion, suspension or dispersion etc. The metal elements are preferably present in the present sulfur transfer additive as organic acid salts or inorganic acid salts. When the metal elements are present as organic acid salts, the organic acid can be, for example, substituted or unsubstituted, saturated or unsaturated carboxylic acid, alkyl- or aryl-sulfonic acid, any combination thereof, or the like. The specific example thereof includes propanoic acid, malonic acid, butanoic acid, isobutyric acid, 2-methyl butanoic acid, octanoic acid, isooctanoic acid, isononanoic acid, benzoic acid, naphthenic acid, citric acid, tartaric acid, fatty acid, oleic acid, dodecylbenzene sulfonic acid, para-toluene sulfonic acid and the like. When the metal elements are present as inorganic acid salts, the inorganic acid can be, for example, nitric acid, phosphoric acid, sulfonic acid, carbonic acid, sulfuric acid, chlorhydric acid, hydrobromic acid and the like, preferably nitric acid, phosphoric acid, sulfonic acid and carbonic acid.

There is no particular restriction on the ratio among the metal elements in the present sulfur transfer additive, and the ratio can be varied depending upon, for example, the desired sulfur content in the light oil products and the desired $SO_x$ content in the regenerator flue gas. In general, if it is required to decrease the sulfur content in the light oil products to a much lower level, it is advantageous to increase the proportion of the metal elements of class b) and/or c); and if it is required to decrease the $SO_x$ content in the regenerator flue gas to a much lower level, it is desirable to increase the proportion of the metal elements of class a) and/or c) However, in the present sulfur transfer additive, the weight ratio of the metal elements of class a) to class b), or class a) to class c), or class b) to class c) is generally from 1:20 to 20:1, preferably from 4:16 to 16:4, and more preferably from 8:12 to 12:8.

As stated above, the present sulfur transfer additive is a uniform liquid product The term "a uniform liquid product" means that the compounds of said metal elements are uniformly distributed in a liquid medium, to form, for example, a solution, colloid, emulsion, suspension, dispersion or the like of the metal compounds. There is no particular restriction on the liquid medium used in the present sulfur transfer additive, and any liquid medium which can uniformly distribute the relevant metal compounds to form a solution, colloid, emulsion, suspension or dispersion can be used. The liquid medium can, for example, be water, alcohols, hydrocarbons, ethers, ketones, any combination thereof and the like. The specific example thereof includes water, methanol, ethanol, benzene, toluene, xylene, ethylbenzene, isooctane, dodecane, and 200# solvent oil, etc. If desired, for example to assist in dispersing, stabilizing, emulsifying and/or dissolving, an assistant component can be additionally used in the present sulfur transfer additive. The assistant component can be alcohols, ethers, esters, amines, amides, alcohol amines, ionic or non-ionic surfactants, any combination thereof, and the like. The specific example thereof includes ethylene glycol, propylene glycol, diethylene glycol, isobutanol, methyl isobutyl ether, ethylene glycol dimethyl ether, propylamine, butylamine, ethylenediamine, 1,4-butylenediamine, dimethyl formamide, benzoic amide, monoethanolamine, diglycolaine, polyvinyl alcohol, nonylphenol polyoxyethylene ether, aliphatic alcohol polyoxyethylene ether, oleic diethanolamide, etc., preferably ethylene glycol, diethylene glycol, methyl isobutyl ether, diglycolamine, nonylphenol polyoxyethylene ether, and oleic diethanolamide.

There is no particular restriction on concentration of the metal compounds, and amount of the liquid medium and optional assistant component in the present sulfur transfer additive, as long as a uniform liquid product, especially a stable solution, colloid, emulsion, suspension or dispersion can be formed. However, in an embodiment of the present invention, the present sulfur transfer additive is water-soluble, and contains, based on the total weight of the additive, 10 to 80%, preferably 15 to 70%, more preferably 25 to 60%, most preferably 35 to 50% by weight of the metal compounds, 10 to 50%, preferably 20 to 45%, more preferably 25 to 40%, most preferably 30 to 36% by weight of the liquid medium, and 10 to 40%, preferably 12 to 36%, more preferably 15 to 32%, most preferably 20 to 30% by weight of the assistant component. This water-soluble additive is low in costs, easy to be handled and cleaned, and less hazardous. In another embodiment of the present invention, the present sulfur transfer additive is oil-soluble, and contains, based on the total weight of the additive, 50 to 85%, preferably 53 to 80%, more preferably 57 to 75%, most preferably 60 to 70% by weight of the metal compounds, 10 to 30%, preferably 12 to 28%, more preferably 15 to 26%, most preferably 18 to 25% by weight of the liquid medium, and 5 to 20%, preferably 7 to 18%, more preferably 10 to 16%, most preferably 12 to 14% by weight of the assistant component. This oil-soluble additive is soluble in the FCC feed and can be well dispersed in hydrocarbons.

The present sulfur transfer additive can be easily prepared in a conventional manner. Based on the teachings of the present application, the uniform liquid product of the present invention can be prepared from the properly selected metal compounds, liquid medium and optional assistant component by various well-known means in the art to prepare a solution, colloid, emulsion, suspension or dispersion. For example, the present sulfur transfer additive in form of a solution, colloid, emulsion, suspension or dispersion can be prepared as follows: a specified amount of metal compounds, liquid medium and optional surfactant are mixed thoroughly at a certain temperature, the mixture is then made to be a uniform liquid by means of colloid mill, ultrasonic wave or the like, and if necessary, a small amount of assistant component is added while stirring, finally a stable liquid product is obtained. More specifically, an illustrative preparation method in laboratory is as follows: a certain amount of metal compounds, equal equivalent of organic or inorganic acid, and proper amount of liquid medium are added to a round-bottom flask. The mixture is heated at a reflux temperature of for example 100 to 130° C. under stirring for a period, usually for 3 to 15 hours, preferably 5 to 10 hours. Then the contents in the flask is cooled down to for example 50 to 80° C., a proper amount of assistant component is added, and the mixture is further stirred for a certain period such as 1 to 2 hours, to obtain a uniform liquid product.

In the second aspect, the present invention provides a process for catalytic cracking of hydrocarbons wherein the liquid sulfur transfer additive as described in the first aspect of the present invention is used to decrease the sulfur content in the light oil products and/or the $SO_x$ content in the regenerator flue gas. The present catalytic cracking process includes various types of fluidized catalytic cracking processes, for example, gas oil fluidized catalytic cracking, residuum catalytic cracking (RFCC), deep catalytic cracking (DCC), and other fluidized catalytic cracking derivative processes based on the continuous reaction-regeneration mechanism of fluidized catalytic cracking for processing hydrocarbons, such as MGG, ARGG, MIO and the like. Except the use of the present liquid sulfur transfer additive, the process parameters, equipment used and flow scheme of the present catalytic cracking process are the same as those in the prior art, and are well-known in the catalytic cracking art.

As the sulfur transfer additive used is a liquid product, the addition system for the additive needs no complex equipment, and can comprise only a tank, a pump and necessary pipes. In the present catalytic cracking process, the liquid sulfur transfer additive can be added into the reactor together with the catalytic cracking feed stream or together with the steam, or can be added into the reactor and/or regenerator separately as a separate stream. Additionally, the liquid sulfur transfer additive can be used together with other liquid process additive or stream, for example, it can be added into the reactor and/or regenerator after being mixed with metal passivator, or slurry antifoulant, or riser reactor quench oil. Said catalytic cracking feed stream can be fresh feedstock and/or recycled feed oil, i.e. recycled oil and recycled slurry.

In the present catalytic cracking process, the addition amount of the sulfur transfer additive can be varied over a wide range, and the specific addition amount depends upon several factors such as the specific operation conditions for the catalytic cracker, the sulfur content in the feedstock, the desired $SO_x$ level in the flue gas, the desired sulfur content in the light oil products, and the concentration of the effective components (i.e. the metal compounds) in the sulfur transfer additive, etc. Taking the specific operation conditions and the various requirements into consideration, the ordinary skilled in the art can easily determine the addition amount of the sulfur transfer additive via routine experiments. In general, the sulfur transfer additive is added in such an amount that the deposit amount of the sulfur transfer additive on the catalyst is above 0 to 10%, preferably 0.05 to 6%, more preferably 0.1 to 4%, most preferably 0.2 to 1% by weight, said "deposit amount" is the weight percent of the total weight of the metal elements provided by the sulfur transfer additive and deposited on the catalyst based on the weight of the catalyst in the FCC system.

The general and preferable selections with respect to the sulfur transfer additive in the first aspect of the present invention also apply to the present catalytic cracking process.

The liquid sulfur transfer additive and the catalytic cracking process provided by the present invention can reduce the $SO_x$ concentration in regenerator flue gas by 10~80% and the sulfur content in the light oil products by 5~30% without any negative effect on the activity and selectivity of the catalyst of FCC system. As the sulfur transfer additive is a liquid, the preparation thereof needs no complex equipment such as spray drying equipment, etc., and it can be manufactured at a lower cost, the addition amount of the liquid sulfur transfer additive can be flexibly adjusted, and thus, can be controlled automatically.

The following examples are provided to illustrate the present invention. The examples are not intended to limit the scope of the present invention in any way, and they should not be so interpreted.

In the present application, the microactivity of a catalyst is determined in the conventional test method well-known in the art using the following test conditions:

| | |
|---|---|
| Reaction temperature: | 500° C. |
| Catalyst inventory: | 5 grams |
| Reaction time: | 70 seconds |
| Space velocity: | 16 h$^{-1}$ |
| Weight ratio of catalyst to oil: | 3.2 |

The microactivity (MA) is calculated according to the following equation:

$$MA = 100 - W_1(100-G)/W$$

wherein W is the weight of the feedstock in grams, $W_1$ is the weight of the converted oil products in grams, and G is the weight percent of the gas oil in the converted oil products.

In the following Example 7, the sulfur transfer performance of the present sulfur transfer additive is evaluated in a test on a fixed-bed plant, which is carried out as follows. 5 g of catalytic cracking catalyst aged and impregnated with the sulfur transfer additive is loaded to the reactor, is subject to $SO_x$ uptake for 1 hour in atmosphere of a reaction gas consisting of $SO_2$, $N_2$ and $O_2$ at a temperature of 730° C., then is stripped with $N_2$ for 10 minutes and finally is desorbed with a reducing gas consisting of $H_2$ and $H_2O$ at a temperature of 520° C. The $SO_x$ removal rate can be calculated according to the following equation.

$SO_x$ removal rate (v%)=($SO_2$% in the initial reaction gas $SO_2$% after $SO_x$ uptake by the catalyst)/$SO_2$% in the initial reaction gas

EXAMPLE 1

22.9 g of lanthanum carbonate (>99% purity), 8.4 g of magnesium carbonate (>99% purity), 6.7 g of tin protoxide, 86.3 g of isocaprylic acid, 10 g of 200# solvent oil and 0.5 g of nonyl phenol polyoxyethylene ether are added to a flask. The resultant mixture is heated to a temperature in range of 103 to 110° C. and maintained at this temperature for 3 hours while stirring, and then cooled down to 80° C. Thereafter, 9.7 g of tributyl aluminum is added and uniformly mixed. The resulting product is a dark brown uniform liquid, whose properties are shown in Table 1.

EXAMPLE 2

23 g of cerium carbonate (>99% purity), 8.4 g of magnesium carbonate (>99% purity), 11.6 g of bismuth trioxide, 4.1 g of zinc oxide and 55.5 g of propanoic acid are added to a flask. 8 g of dimethyl formamide and 3 g of diethylene glycol are successively added while stirring. The resultant mixture is heated to a temperature in a range of 100 to 105° C., maintained at this temperature for 8 hours, and cooled down to 50° C. 3.0 g of ethyl formate is then added and uniformly mixed. The resulting product was a dark brown uniform liquid, whose properties are shown in Table 1.

EXAMPLE 3

10 g of magnesium oxide (>99% purity), 75 g of citric acid, 10 of diglycolamine and 30 g of water are added to a flask. The resultant mixture is heated at 100 to 105° C. for 3 hours, and then is cooled down to 60° C. 30 g of praseodymium carbonate is added slowly, and the resultant mixture is heated to 100–104° C. and maintained for 6 hours, and then is cooled to 50° C. 5 g of triethylene tetraamine is added, a uniform liquid is obtained after stirring.

EXAMPLE 4

20 g of neodymium carbonate (>99% purity), 30 g of oleic acid, 5 g of 1,4-butandiamine and 20 g of xylene are added to a flask. The mixture is heated at a reflux temperature of 135 to 138° C. for 5 hours, cooled to 50° C., and then 30 g of cadmium stearate, 5 g of cocoanut oleic diethanolamide and 3 g of aliphatic alcohol polyoxyethylene ether are added. The resultant mixture is further stirred for 2 hours to obtain a uniform liquid.

EXAMPLE 5

25 g of polyvinyl alcohol with a weight average molecular weight of 7000 to 8000, and 50 g of water are added to a beaker, the mixture is treated by means of ultrasonic wave for 4 hours. Then, 10 g of cerium oxide, 10 g of calcium oxide, 10 g of lead oxide, 13 g of methyl diethanolamine and 3 g of propanetriol are added, and the mixture is further dispersed by means of ultrasonic wave for 10 hours, a stable suspension is obtained.

TABLE 1

| Item | Example 1 | Example 2 |
|---|---|---|
| Physical State | Dark Brown Uniform Liquid | Dark Brown Uniform Liquid |
| Density, 20° C., kg/m³ | 1260 | 1530 |
| Viscosity, 40° C., mm²/s | 98 | 38 |
| Solubility | Oil Soluble | Water Soluble |
| Metal Content, % | | |
| La | 10.8 | \ |
| Ce | \ | 10.9 |
| Mg | 1.90 | 1.9 |
| Bi | \ | 8.3 |
| Sn | 4.6 | \ |
| Zn | \ | 2.6 |
| Al | 1.0 | \ |

EXAMPLE 6

4 catalyst identified as A, B, C, and D were selected, wherein catalysts A and B are fresh catalysts while catalysts C and D are commercial equilibrium catalysts whose properties are shown in Table 2. First, catalysts A, B, C and D are calcinated at 450° C. for 2 hours, then catalyst A is impregnated with the liquid sulfur transfer additive prepared in Example 1, and catalysts B, C and D are impregnated with the liquid sulfur transfer additive prepared in Example 2. All the impregnated catalysts are aged at 760° C. in 100% steam atmosphere for 6 hours. The catalysts thus treated are tested for their microactivity on MAT plant using Dagang gas oil fraction (237~337° C.). The test results are listed in Table 3. It can be seen from the data that the present liquid sulfur transfer additives have no negative impact on the activity of the catalytic cracking catalyst, to the contrary they increase the catalyst activity to some extent. The comparison of the activity of the fresh and the equilibrium catalyst indicates that the liquid s r transfer additive has a greater incremental effect on the activity of the fresh catalyst.

TABLE 2

Main Physical and Chemical properties of the Catalysts

| Catalyst | A | B | C | D |
|---|---|---|---|---|
| Chemical Composition, % | | | | |
| $Al_2O_3$ | 41.96 | 50.4 | 41.5 | 42.45 |
| $Fe_2O_3$ | 0.64 | 0.45 | 1.2 | 0.59 |
| $Na_2O$ | 0.38 | 0.17 | 0.3 | 0.49 |
| $Re_2O_3$ | 1.96 | / | 2.98 | 1.42 |
| Particle Size Distribution, wt % | | | | |
| >20 μm | 3.6 | 2.8 | 3.1 | 0.50 |
| 20~40 μm | 14.3 | 18.9 | 18.4 | 3.30 |
| 40~80 μm | 55.9 | 60.8 | 54.8 | 70.70 |
| <80 μm | 26.2 | 17.5 | 23.7 | 25.50 |

TABLE 2-continued

Main Physical and Chemical properties of the Catalysts

| Catalyst | A | B | C | D |
|---|---|---|---|---|
| Physical Properties | | | | |
| Surface Area, m²/g | 189 | 190 | 1.7 | 106 |
| Pore Volume, ml/g | 0.152 | 0.34 | 0.26 | 0.125 |
| Bulk Density, g/ml | 0.72 | 0.76 | / | / |
| Lattice Constant, Å | 24.39 | / | 24.42 | / |
| Microactivity (760° C., 6 h) | 70.5 | 67.0 | 60 | 61.7 |
| Metal Contest, μg/g | | | | |
| Ni | / | / | 4400 | 5800 |
| V | / | / | 520 | 1050 |
| Fe | / | / | 3600 | 4050 |
| Na | / | / | 4600 | 6100 |

TABLE 3

The Activity of the Treated Catalysts

| deposit amount of the additive on the catalyst, wt % | Microactivity, m % | | | |
|---|---|---|---|---|
| M | A | B | C | D |
| 0 | 70.1 | 67.0 | 60.2 | 61.7 |
| 0.2 | 70.8 | 67.2 | 59.8 | 61.5 |
| 0.4 | 70.5 | 67.8 | 60.0 | 61.8 |
| 0.8 | 71.4 | 68.4 | 61.4 | 62.5 |
| 1.2 | 72.6 | 68.9 | 61.9 | 63.1 |
| 1.5 | 73.0 | 70.1 | 62.2 | 62.8 |

EXAMPLE 7

Catalysts A, C and D prepared in Example 6 are tested for their sulfur transfer and regeneration performance by the uptake/desorption tests on a fix-bed reactor using a reaction gas ($SO_2$ 0.12 v %, $O_2$ 3.5 v %, $N_2$ 96.38 v %) and a reducing gas ($SO_2$ 0.12 v %, $H_2O$ 2.0 v %). The gas flow rate is 30 ml/min. First, the catalysts are subject to $SO_x$ uptake in the reaction gas at 730° C. for 1 hour, then stripped for 10 miuntes with $N_2$, and finally desorbed in the reducing gas at 520° C. This procedure is repeated several times, and the average test results are listed in Table 4.

TABLE 4

Sulfur Transfer Performance of the Liquid Sulfur Transfer Additive

| Deposit amount of the additive | $SO_x$ Removal Rate, v % | | |
|---|---|---|---|
| on the catalyst, wt % | Catalyst A | Catalyst C | Catalyst D |
| 0 | 0 | 0 | 0 |
| 0.2 | 38.1 | 45.5 | 43.7 |
| 0.4 | 45.0 | 49.7 | 51.6 |
| 0.6 | 48.8 | 54.6 | 57.3 |
| 0.8 | 53.3 | 60.5 | 62.4 |
| 1.0 | 63.8 | 79.9 | 74.1 |

EXAMPLE 8

The fresh catalysts A and the commercial equilibrium catalysts C and D as described in Example 6 are calcinated at 450° C. for 2 hours, impregnated with the liquid sulfur transfer additive prepared in Example 3 and 5, respectively, and then aged at 760° C. in 100% steam atmosphere for 6 hours. The obtained catalysts are tested for their sulfur transfer performance by the test as described in Example 7. The results are reported in Table 5.

TABLE 5

Sulfur Transfer Performance of the Liquid Sulfur Transfer Additive

| Sulfur Transfer Additive | Deposit Amount of the Additive, wt % | $SO_x$ Removal Rate, v % | | |
|---|---|---|---|---|
| | | Catalyst A | Catalyst C | Catalyst D |
| / | 0 | 0 | 0 | 0 |
| Example 3 | 0.4 | 40.4 | 42.7 | 46.9 |
| | 0.8 | 48.3 | 55.1 | 53.3 |
| | 1.0 | 51.7 | 58.7 | 60.4 |
| Example 5 | 0.4 | 34.2 | 38.5 | 40.3 |
| | 0.8 | 46.8 | 52.2 | 53.8 |

EXAMPLE 9

This Example is carried out on a FCC riser pilot plant with a catalyst inventory of 4 kg, using the present liquid sulfur transfer additive and the commercial equilibrium catalyst C (as described in Example 6). The liquid transfer additive is pumped into the atmospheric residuum of Zhongyuan Mix Crude (see Table 6 for properties) to be cracked and introduced into the reactor. The sulfur transfer performance of said liquid transfer additive was investigated under the cracking conditions specified in Table 6. The sulfur transfer efficiency of the additive can be represented with the reduction percentage of $SO_x$ in the flue gas compared with the blank.

Table 8 lists the sulfur amount in the light oil products (gasoline and light diesel) and in the flue gas when different kinds and amounts of liquid sulfur transfer additive are added to the oil feed, the data in the Table is the weight percent of the sulfur transferred to the light oil products or the flue gas based on the total amount of the sulfur contained in the oil feed. Table 9 lists the mercaptan sulfur and thiophene sulfur distribution in cracked gasoline of FCC when different kinds and amounts of liquid sulfur transfer additive are added to the oil feed, the data in the Table is the weight percent of the sulfur converted to mercaptan or thiophene based on the total amount of the sulfur contained in the oil feed. It can bee seen from the table that when the deposit amount of the sulfur transfer additive on the cracking catalyst is 5000~12000 ppm, the $SO_x$ emission in regenerator flue gas is reduced by 40~80% and the sulfur in the light oil products is reduced by 5~30%.

TABLE 6

Feed Oil Properties

| Item | Data |
|---|---|
| Density, 20° C., kg/m³ | 910.2 |
| Molecular Weight | 454 |
| Carbon Residue, wt % | 5.68 |
| Viscosity, mm2/s | |
| 80° C. | 89.5 |
| 100° C. | 15.6 |
| Elemental Analysis, m % | |
| C | 86.49 |
| H | 12.60 |
| S | 0.7384 |
| N | 0.1628 |

TABLE 6-continued

Feed Oil Properties

| Item | Data |
|---|---|
| Hydrocarbon Family, wt % | |
| Saturated Hydrocarbon | 52.6 |
| Aromatics | 33.4 |
| Gum + Asphaltene | 14.0 |
| Distillation Range, ° C. | |
| 10% | 319 |
| 30% | 413 |
| 60% | 508 |
| 90% | 678 |

TABLE 7

Conditions of Riser FCC Pilot Plant Experiment

| | |
|---|---|
| Riser Reactor Outlet Temperature, ° C. | 520 |
| Feed Preheat Temperature, ° C. | 340 |
| Regenerator Temperature, ° C. | 720 |
| Reactor Pressure, MPa | 0.15 |
| Weight Ratio of Catalyst to Oil | 7.0 |
| Atomizing Water, wt % | 6.5 |

TABLE 8

Sulfur amount in the light oil products and the flue gas

| Sulfur Transfer Additive | Deposit Amount, wt % | In Gasoline | In Light Diesel | In Flue gas |
|---|---|---|---|---|
| — | 0 | 5.43 | 13.28 | 14.62 |
| Example 1 | 0.5 | 5.18 | 13.16 | 8.79 |
| | 0.8 | 4.69 | 12.84 | 7.43 |
| | 1.2 | 3.80 | 12.49 | 2.92 |
| Example 2 | 0.5 | 5.09 | 13.13 | 8.81 |
| | 1.8 | 4.52 | 12.66 | 7.38 |
| | 1.2 | 3.85 | 12.41 | 2.90 |
| Example 4 | 0.5 | 5.24 | 13.20 | 9.44 |
| | 0.8 | 4.81 | 13.02 | 8.15 |

TABLE 9

Amount of Mercaptan Sulfur and Thiophene Sulfur in the Gasoline

| Sulfur Transfer Additive | Deposit Amount, wt % | Mercaptan Sulfur | Thiophene Sulfur |
|---|---|---|---|
| — | 0 | 0.23 | 5.20 |
| Example 1 | 0.5 | 0.16 | 5.02 |
| | 0.8 | 0.08 | 4.57 |
| | 1.2 | 0.17 | 3.99 |
| Example 2 | 0.5 | 0.17 | 4.92 |
| | 0.8 | 0.13 | 4.39 |
| | 1.2 | 0.08 | 3.77 |
| Example 4 | 0.5 | 0.18 | 5.06 |
| | 0.8 | 0.11 | 4.70 |

What is climed is:

1. A process for catalytic cracking of a hydrocarbon feed comprising carrying out a catalytic cracking reaction in the presence of a catalytic cracking catalyst and a sulfur transfer additive, wherein the sulfur transfer additive is provided as a uniform liquid consisting essentially of at least two metal compounds and an assistant component in a liquid dispersing medium, wherein the first metal in the first of the metal compounds is selected from the group consisting of alkaline earth metals and the second metal of the second of the metal compounds is selected from the group consisting of Groups IB, IIB, IIIB, IVB, VB, VIB elements, Tc, Re, Fe, Co, Ni, and P zone metals, and rare earth metals; the assistant component is selected from the-group consisting of alcohols, ethers, esters, amines, amides, alcohol amines, ionic or non-ionic surfactants, and combinations thereof; the liquid dispersing medium is selected from the group consisting of water, alcohols, hydrocarbons, and combinations thereof; and the sulfur transfer additive is provided on the catalyst in an amount not more than 10% by weight.

2. The process of claim 1 wherein the weight ratio of a first of the at least two metals to a second of the at least two metals is between about 1:20 and about 20:1.

3. The process of claim 1 wherein the metal compounds are compounds selected from the group consisting of oxides, hydroxides, organic acid salts, inorganic acid salts, complexes, and combinations thereof.

4. The process of claim 3 wherein the metal compounds are organic acid salts, and the organic acid of each organic acid salt is selected from the group consisting of substituted or unsubstituted, saturated or unsaturated carboxylic acids, alkyl-or aryl-sulfonic acids, and combinations thereof.

5. The process of claim 3 wherein the metal compounds are inorganic acid salts, and the inorganic acid of each inorganic acid salt is selected from the group consisting of nitric acid, phosphoric acid, sulfonic acid and combinations thereof.

6. The process of claim 1 wherein the uniform liquid is in a form selected from the group consisting of solutions, colloids, emulsions, suspensions, and dispersions.

7. The process of claim 6 wherein the uniform liquid is in the form of a solution.

8. The process of claim 1 wherein the first metal is selected from the group consisting of Mg, Ca, Sr, and Ba; and the second metal is selected from the group consisting of Zn, Ag, Cd, Ti, Bi, Al, Pb, Sn, La, Ce, Pr and Nd.

9. The process of claim 8 wherein the first metal is selected from the group consisting of Mg and Ca; and the second metal is selected from the group consisting of Zn, Ag, Cd and Ti.

10. The process of claim 1 wherein the sulfur transfer additive is water-soluble and contains, based on the total weight of the additive, 10 to 80% by weight of the metal compounds, 10 to 50% by weight of the liquid dispersing medium, and 10 to 40% by weight of the assistant component.

11. The process of claim 1 wherein the sulfur transfer additive is oil-soluble and contains, based on the total weight of the additive, 50 to 85% by weight of the metal compounds; 10 to 30% by weight of the liquid dispersing medium, and 5 to 20% by weight of the assistant component.

12. The process of claim 1 wherein the sulfur transfer additive is provided on the catalyst in an amount between 0.2% and 1% by weight.

13. The process of claim 1 wherein the catalytic cracking process is carried out in a fluid catalytic cracking unit comprising a reactor and a regenerator.

14. The process of claim 13 wherein the sulfur transfer additive is added to the reactor together with a process feed stream.

15. The process of claim 13 wherein the sulfur transfer additive is added to the reactor or regenerator together with at least one other liquid catalytic cracking additive.

16. The process of claim 13 wherein the sulfur transfer additive is added to both the reactor and the regenerator.

17. The process of claim 13 wherein the sulfur transfer additive is added to the regenerator.

18. The process of claim 1, wherein the hydrocarbon feed is selected from the group consisting of a fresh feed, a recycled oil feed and combinations thereof.

19. The process of claim 1, wherein the catalytic cracking reaction is selected from the group consisting of gas oil catalytic cracking reactions, residuum oil catalytic cracking reactions, and deep catalytic cracking reactions.

* * * * *